United States Patent [19]

Boyesen et al.

[11] Patent Number: 5,247,912

[45] Date of Patent: Sep. 28, 1993

[54] REED VALVE MECHANISM AND METHOD FOR CONSTRUCTING SAME

[75] Inventors: Eyvind Boyesen, Kempton; Robert E. Rarick, II, Bowers; Ragnar Boyesen, Freeport, all of Pa.

[73] Assignee: Performance Industries, Inc., Kempton, Pa.

[21] Appl. No.: 813,952

[22] Filed: Dec. 24, 1991

[51] Int. Cl.$^5$ .............................. F02B 75/20
[52] U.S. Cl. ........................ 123/65 V; 123/73 V; 137/855
[58] Field of Search .............. 123/65 V, 73 V; 137/855, 856

[56] References Cited

U.S. PATENT DOCUMENTS

| | | |
|---|---|---|
| 157,791 | 12/1874 | Cameron . |
| 351,121 | 10/1886 | Meyer . |
| 919,036 | 4/1909 | Langer . |
| 939,549 | 11/1909 | Reineking . |
| 2,065,062 | 12/1936 | Dugelay . |
| 2,382,716 | 8/1945 | Herzmark . |
| 2,689,552 | 9/1954 | Kiekhaefer . |
| 3,286,728 | 11/1966 | Stepehenson . |
| 3,690,304 | 9/1972 | Schneider et al. ............ 123/73 V |
| 3,859,968 | 1/1975 | Stinebaugh ................. 123/73 V |
| 3,896,847 | 7/1975 | Bauer et al. ............... 137/512.15 |
| 3,905,340 | 9/1975 | Boyesen ..................... 123/73 A |
| 4,000,723 | 1/1977 | Boyesen ..................... 123/73 AA |
| 4,051,820 | 10/1977 | Boyesen ..................... 123/73 A |
| 4,082,295 | 4/1978 | Bainard ..................... 123/73 V |
| 4,083,184 | 4/1978 | Ushijima et al. ............. 137/515.7 |
| 4,089,348 | 5/1978 | Yoshida et al. .............. 137/856 |
| 4,191,138 | 3/1980 | Jaulmes ..................... 123/73 R |
| 4,250,844 | 2/1981 | Tews ........................ 123/73 AV |
| 4,257,458 | 3/1981 | Kondo et al. ................ 137/855 |
| 4,324,097 | 4/1982 | Schmitt et al. .............. 60/293 |
| 4,331,118 | 5/1982 | Cullinan .................... 123/433 |
| 4,408,579 | 10/1983 | Kusche ...................... 123/73 V |
| 4,633,825 | 1/1987 | Flaig ....................... 123/73 V |
| 4,643,139 | 2/1987 | Hargreaves .................. 123/65 V |
| 4,696,263 | 9/1987 | Boyesen ..................... 128/65 V |
| 4,712,520 | 12/1987 | Pasquin ..................... 123/73 S |
| 4,879,976 | 11/1989 | Boyesen ..................... 123/73 V |
| 5,010,918 | 4/1991 | Tolsma ...................... 137/512.15 |
| 5,036,806 | 8/1991 | Rarick ...................... 123/65 V |

FOREIGN PATENT DOCUMENTS

| | | | |
|---|---|---|---|
| 2625057 | 2/1977 | Fed. Rep. of Germany ...... 137/856 |
| 55-5476 | 1/1980 | Japan . | |
| 58-54278 | 3/1983 | Japan ...................... 137/855 |
| 58-61372 | 4/1983 | Japan ...................... 137/855 |
| 59-73673 | 4/1984 | Japan ...................... 137/855 |
| 60-14670 | 1/1985 | Japan ...................... 137/855 |
| 3-177664 | 8/1991 | Japan ...................... 137/855 |

OTHER PUBLICATIONS

"Boyesen Rad Valve," Dirt Wheels, Oct. 1988, p. 31.

*Primary Examiner*—David A. Okonsky
*Attorney, Agent, or Firm*—John W. Logan, Jr.

[57] ABSTRACT

An improved apparatus and method of construction of a reed valve mechanism having a cushioned reed valve seat is disclosed. The present invention provides a smooth resilient overlay plate which is attached around ports in a reed cage. The benefits of conventional rubber coated reed cages is supplied without the expenses inherent in previous construction methods. Various mechanical mounting means are disclosed for ease in construction and improved reed valve performance.

36 Claims, 7 Drawing Sheets

REED VALVE MECHANISM AND METHOD FOR CONSTRUCTING SAME

BACKGROUND OF THE INVENTION

1. Field of the Invention

The present invention is directed to reed valve mechanisms for use in controlling fluid intake into and/or through fluid passages in internal combustion engines and in other fluid passages. More particularly, the present invention provides improved apparatus and method for constructing such reed mechanisms.

2 Background of the Prior Art

Presently it is common to employ various valve mechanisms to control air or air and fuel intake into and through internal combustion engines. The most widespread use of such valves today is a flexible "reed valve" which covers a port in a reed cage. The reed valve is attached at one of its ends to a base of the reed cage, allowing its unattached opposite end covering the port to be lifted away from the port. By orienting the reed cage in a downstream direction in the engine's air intake passage, when a negative pressure is present in the engine, the reed valve is flexed away from the reed cage port and fluid is permitted to be drawn into the engine; when draw from the engine ceases, the reed valve shuts upon the port and fluid flow ceases.

The use of such reed valves is now standard on most crankcase compression two-stroke cycle engines both to control fluid intake and fluid transfer from the crankcase to the combustion chamber. Examples of such mechanisms are disclosed in applicant's U.S. Pat. Nos. 3,905,340, 3,905,341, and 4,051,820. More recently, similar reed valves have been utilized to improve engine performance in a variety of other applications, including in four-stroke cycle engines.

In addition to internal combustion engine applications, reed valves are commonly employed today in a number of other applications to control fluid flow through a fluid passage. Such other uses include use of a reed valve in air conditioning compressors and similar devices to assure fluid flow in only one direction through the unit.

With the widespread use of reed valves, including metal and fiber composites, there has been considerable interest in finding ways to improve reed valve life and performance. One of the oldest techniques to improve reed valve life is to coat the reed cage with an elastomer, such as rubber or plastic, to provide a cushioned seat for the reed valve to strike on each cycle of the engine. In internal combustion engines, the use of such a cushioned seat is considered crucial to achieve adequate reed valve life from most conventional reed valves.

The conventional process for creating a cushioned reed valve seat is time consuming and expensive. Currently reed cage manufacturers must first arrange to have a recess provided in the reed cage surrounding each port in the reed cage. This is accomplished either by casting the reed cages with the recess or by machining the recess into the cage once the cage has been constructed. Once the recess is provided, the reed cage is then subjected to a complex coating process.

To coat the reed cage with rubber, generally two dies are furnished, one adapted to surround the outside of the recessed portion of the reed cage and the other inserted on the inside of the reed cage to prevent rubber from leaking into the interior of the reed cage. These dies must be carefully proportioned to assure exact fit and minimal leakage during rubber casting. Once the dies are in place, liquid rubber is injected under pressure into openings in the dies to fill the recessed portion of the reed cage.

After the rubber coating is applied, the rubber coating must then be planed or machined down to provide a smooth valve seat surrounding each port. If machining is not performed exactly or if too little rubber has been provided (e.g. as the result of air pockets), an uneven surface may be created which will lessen engine performance and may cause premature wear and deterioration of the reed valves.

Another common problem emerges if the dies do not exactly fit the reed cage. In these instances, the rubber will spread well beyond the recessed portion of the reed cage and require additional machining work for preparation of the valve cage. Evidence of such rubber leakage is a commonly seen on production reed cage units.

The entire procedure is extremely exacting and very expensive, costing on the order of approximately $14.00 per valve for low volume production and no less than approximately $3.00 per valve for very high volume production. These costs severely restrict the use of rubber coated valve seats to only higher cost applications, making it unrealistic to coat inexpensive reed cages such as reed plates in air compressors.

The molding process itself also tends to limit the type of valves which may be rubber coated. Reed cage designs which do not readily permit the insertion of a die or machining equipment into the interior of the reed cage, such as the aeroform reed cage disclosed in applicant's U.S. Pat. No. 4,879,976, cannot be rubber coated using this process without employing even more precise dies. Although it is possible to rubber coat these units by using a die which only mounts on the outside of the cage and includes projections which exactly fit within each port in the reed cage to prevent leakage into the interior of the reed cage, this process has design tolerances which are so demanding that full production quantities are not practicable.

In response to the restrictions and high costs of this procedure, a number of other solutions have been implemented. In U.S. Pat. No. 4,696,263, applicant disclosed that the reed valves themselves may be rubber coated to improve life and performance. It has been found that reed valves constructed using this technique will perform as well or better against an un-cushioned reed cage as conventional reed valves will perform against a rubber coated reed cage. However, if these rubber coated valves are combined with a properly constructed rubber coated reed cage, exceptional reed valve life can be expected.

Other procedures which have been implemented to avoid premature reed valve failure include techniques for improving flow through the reed cage itself, such as is disclosed in applicant's U.S. Pat. No. 4,879,976, and various modifications to basic reed valve design to limit stresses on the reed petals, such as is disclosed in applicant's U.S. Pat. No. 5,036,806. Despite the successes with these strategies, a cushioned reed cage remains highly desirable for maximum reed valve life.

Various attempts to create a less expensive cushioned reed cage also have been explored over the years. A number of patents have apparently described applying an independent layer of elastomer directly to a reed cage in order to cushion the reed valve. In U.S. Pat. No.

3,286,728 to Stephenson, issued Nov. 22, 1966, it is suggested to apply a layer of elastomer alone to a single face of a reed cage in order to create a cushioned reed valve seat. The precise method of attachment of the elastomer is not addressed in this patent. U.S. Pat. No. 4,633,825 to Flaig, issued Jan. 6, 1987, similarly teaches that a single layer of elastomer alone may be applied to each face of a non-recessed reed cage to provide a cushioned reed seat. A grommet is employed to assist in holding the elastomer layer in place on the distal end and the reed valve mounting hardware is used to hold the reed valves members and the elastomer in place on the base end.

In a somewhat different application, U.S. Pat. No. 4,082,295 to Bainard, issued Apr. 4, 1978, shows use of a reed valve to control fluid flow between crankcase chambers of a multiple cylinder two-stroke cycle engine and an elastomer seal attached to the reed valve seat to seal against the crankshaft. In that patent it is suggested to employ a rubber coating on a metal substrate as a non-recessed reed valve seat, with a mounting bolt passing through a reed valve and the reed valve seat to hold the entire unit together. Although it is not shown, that patent also suggests employing a similar non-recessed, rubber coated metal reed valve seat in other reed valve construction, such as that shown in the Stephenson patent.

Although the apparatus disclosed in the above patents may function adequately, further significant improvements are believed possible in reed cage construction. First, although a number of the above patents suggest avoiding a recessed reed cage, a recessed reed cage is believed to be important for proper reed valve performance. Second, none of the above patents is believed to provide a fully adequate method of mounting a separate elastomer layer to the reed cage. Among the probable problems are: the fragile nature of a non-reinforced elastomer layer; likely stress and reed valve member deformation problems from attempting to mount the base of the reed valve member directly on top of the elastomer layer; and insufficient and/or overly complicated methods of mounting the elastomer layer.

Accordingly, it is a primary object of the present invention to provide a method of construction of a reed valve mechanism for use in an internal combustion engine which supplies a cushioned reed valve seat at minimal manufacturing cost and effort.

It is a further object of the present invention to provide such a reed valve mechanism with a smooth and even valve seat without the need for machining of the cushioned surface.

It is an additional object of the present invention to provide such a reed valve mechanism which optimize reed valve life and performance by reducing stresses on the reed valve members while assuring proper reed valve operation.

It is another object of the present invention to provide such a reed valve mechanism which is easily and efficiently constructed, with minimal expense and complication.

It is yet another object of the present invention to provide such a reed valve mechanism which may be easily implemented with other advances in reed valve technology to deliver even greater performance and reed valve life.

These and other objects of the present invention will become evident from review of the following specification.

SUMMARY OF THE INVENTION

The present invention provides an improved apparatus and method of construction of reed valve mechanisms having a cushioned valve seat.

In the preferred form, the valve mechanism of the present invention comprises a ported reed cage, reed valves adapted to seal against the reed cage, and a separate cushioned overlay plate adapted to be attached within a recess surrounding the reed cage port to serve as a reed valve seat which is flush with reed cage side walls. The overlay is preferably constructed from a solid metal or fiber-based substrate having a resilient coating of synthetic rubber or similar material applied or affixed to it.

Preferably, the overlay is attached to the reed cage in a manner which provides a solid and unyielding base to which to attach reed valve members. The overlay may be attached with an adhesive and/or through one or more disclosed various mechanical means. Additionally, the mounting means and valve cage base may be further modified to provide even better reed valve performance and life.

By forming the overlay from a preformed sheet of resilient material, a completely smooth and uniform surface may be easily provided. With one or more of the various mechanical mounting means disclosed, overlays may be applied to the reed cage extremely rapidly and inexpensively. In this manner, cushioned reed cages can be manufactured with very smooth and even valve seats, but without the need for tedious and expensive manipulation of the reed cage unit itself to apply a rubber coating.

Use of the reed valve mechanism of the present invention provides exceptional reed valve life and performance. Additionally, the present invention lends itself to use with other reed valve advances, such as rubber coated reed valves and improved reed cage designs, to produce superb reed valve performance.

DESCRIPTION OF THE DRAWINGS

The operation of the present invention should become apparent from the following description when considered in conjunction with the accompanying drawings, in which.

DETAILED DESCRIPTION OF THE INVENTION

The present invention provides an apparatus and method of construction of a reed valve mechanism 10 for use to control fluid flow through a fluid passage. Although the present invention is primarily directed at reed valve mechanisms used to control fluid intake and/or fluid transfer in an internal combustion engine, the present invention may also be employed in a variety of other fluid control applications, such as to control fluid flow through an air compressor or similar device.

Figures 1, 2:
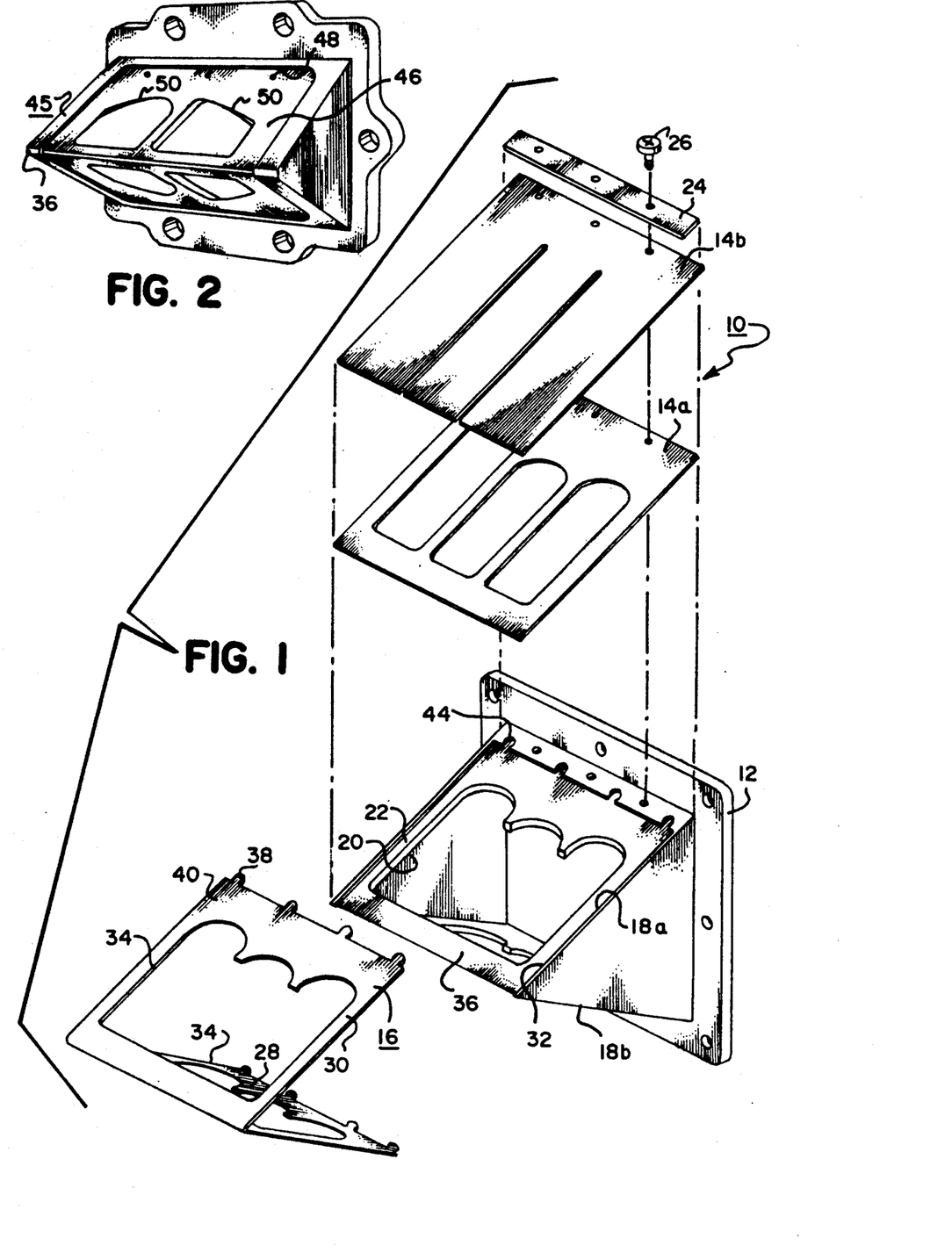
FIG. 1 is a three-quarter isometric view of one embodiment of a valve mechanism of the present invention, with the overlay plate, a reinforcement plate, conventional dual stage reed valves, and a base plate all shown in exploded orientation from a reed valve cage.
FIG. 2 is a three-quarter isometric view of a recessed valve cage for use with the embodiment of the present application shown in FIG. 4.

As is shown in FIG. 1, the reed valve mechanism of the present invention comprises a valve cage 12, reed valve member or members 14a, 14b, and a reed cage overlay plate 16. The reed cage 12 includes one or more side walls 18 and one or more ports 20 in each of the side walls 18. The reed valve members 14 mount to the reed cage 12, sealing each port 20 when the valve members 14 are in a closed position against a valve seat 22 surrounding the periphery of each port 20. The valve members 14 may be retained to the reed cage 12 in any known manner, including through use of a base plate 24 and one or more bolts 26. It should be understood that the term "base plate" as used herein is meant to encompass any form of device mounted over the base of reed valve members to hold them in place, including the plates illustrated and the use of reed stops to accomplish this function.

As has been explained, it is common in present internal combustion engine reed cage designs to include a cushioning rubber coating on the valve seat 22 surrounding each port 20. Such rubber coatings are created by providing a recess surrounding each port 20, containing the reed cage in dies, and then injecting rubber or plastic into the dies until the recess is completely filled to form a rubber coating. The coating must then be machined down to provide a completely smooth and even valve seat.

In the present invention the overlay 16 is substituted for a rubber coating. In the preferred embodiment, the overlay 16 comprises a plate of substrate 28 and a cushioned coating 30 affixed to the substrate 28. The coating 30 should be of a resilient material which will absorb stresses from the reed member 14 striking against the valve seat 22 each cycle of an engine. Such resilient materials may include natural or synthetic rubber such as buna-N rubber, urethane rubber, silicone rubber, neoprene rubber, and fluoroelastomers (e.g materials available under the tradename VITON ®). Although more fragile and difficult to handle, for some applications it may be possible to construct the overlay plate 16 from a layer of smooth resilient material alone.

The substrate 28 may be any thin material which will adequately bond to the choice of coating 30. Substrates of thin metal (e.g. stainless steel, aluminum or alloy) or fiber composites are preferred. It is important that the substrate 28 and coating 30 form a smooth and even valve seat surface. It has been found that a rubber coated fiber stock, such as that employed in applicant's U.S. Pat. No. 4,696,263 to form reed valves, works quite well in this application.

The rubber coated fiber stock material generally comprises a substrate of an epoxy-type resin having glass fiber reinforcement with a heat resistance up to about 350° F., and a resilient cover with high resistance to chemical attack and good resistance to heat and wear. A synthetic rubber of butadiene styrene copolymer ("buna-N rubber") or similar material is preferred. Ideally the cover is preformed in a sheet and then adhesively bonded to a sheet of substrate, either by merely applying the coating to, and curing the coating on, the substrate or by applying coating by means of an adhesive coating or as a preformed sheet of adhesive.

For an overlay of 0.027 to 0.055", a synthetic rubber coating should be of a thickness of 0.002 to 0.030" or more, with a thickness of approximately 0.025" preferred. Since the overlay is not required to bend, the thickness of the substrate is not believed to be particularly critical. However, in the embodiments discussed below which include an overlay adapted to bend over a V-shaped reed cage's apex, the substrate may need to be limited in thickness or to include perforations therein to allow the overlay to be easily molded into the correct position.

One of the chief advantages of the present invention over use of rubber coated reeds alone is the ability to increase the cushioning layer to whatever degree is required. With rubber coated reed valve members, such as is disclosed in applicant's U.S. Pat. No. 4,696,263, the thickness of the cushioning coating on the reed members is limited by the weight (and resulting inertia) of the reed material. Since no movement of the overlay occurs, in the present invention the cushioning layer can be as thick as necessary--thus prolonging overlay and valve life considerably. Additionally, by using the present invention with rubber coated reed valves, the combined reed valve mechanism provides remarkable valve member durability.

Once the overlay 16 material has been formed, the material is then shaped to a correct size to be positioned over the reed cage 12. Overlay ports 34, 34 are formed in the overlay, each generally corresponding in size and dimension with the ports 20 in the reed cage 12. Although not preferred, it should be appreciated that the overlay 16 may be fabricated from multiple sections which combine to surround each port 20 in the reed cage 12. Accordingly, the present invention contemplates each overlay port 34 being formed from one or more overlay sections attached to the reed cage 12.

In a reed cage having an V-shaped apex 36 to be positioned in a downstream direction in an engine intake, it is common for each side wall 18a, 18b of the reed cage to have port or ports formed therein. For such an application, individual overlays may be positioned on each side wall, or, as is shown in FIG. 1, the overlay 16 may be formed in a V-shape corresponding to the shape of the reed cage 12. In such applications, the overlay 16 should include appropriate ports 34, 34 in each of its side walls corresponding in size and dimension with the ports 20 in each of the respective side walls 18.

It is particularly recommended to supply a recess 32 again on the reed cage 12. Such recesses may take the form presently employed in rubber coated reed cage construction or, as is explained below, improved performance with the present invention is believed possible by supplying alternative recess layouts. Each recess should be of sufficient depth and dimension to allow the reed cage overlay 16 to be positioned and attached therein. In the embodiment shown in FIG. 1, the recess 32 extends over the apex of the reed cage 12 to permit the overlay 16 to be positioned flush with the non-recessed areas of the reed cage side walls 18. Accordingly, for a 0.025" overlay, the recessed area should be formed at an even depth of approximately 0.025".

In all embodiments of the present invention disclosed herein, it is encouraged to attach the overlay 16 to the reed cage 12 using an adhesive. The adhesive should be durable and resistant to heat and chemical attack, such as an epoxy-based adhesive. In some applications it may be desirable to permit the overlay 16 to be replaced. In these instances a non-permanent adhesive and/or some form of mechanical attachment method may be used.

In addition to or in place of an adhesive, the overlay plate 16 may be attached to the reed cage 12 through one or more of the mechanical mounting means disclosed in this application or similar methods which may be later developed. The overlay 16 shown in FIG. 1 includes multiple projections 38 on its base end 40. Each of these projections 38 extends below the position of attachment of the reed valve members 14 to the reed cage 12. In this manner, the overlay may be held in place by the same base plate 24 and bolts 26 or other means which anchor the reed valve members 14.

In the preferred form shown in FIG. 1, the recessed area 32 in the reed cage 12 includes complementary recessed extensions 44 which interlock with projections 38 to hold the overlay in position. Even with such interlocking means, it is recommended that adhesive also be used to attach the overlay, with particular emphasis being placed on tightly bonding the overlay 16 to the valve cage 12 in the area underlying each valve seat 22.

It should be appreciated that the present invention may be employed in a wide variety of applications. In this respect, the present invention functions exceptionally well with all forms of reed valve types and with an array of mounting means. Other examples of such uses are disclosed in the embodiment of the present invention shown in FIGS. 2 through 4.

Shown in FIG. 2 is a V-shaped reed cage 45 which includes a recessed area 46 extending completely below the level of reed valve bolt mounting holes 48. The recessed area 46 extends over the apex 36 and below the level of the mounting holes on the opposite side wall (not shown). Two ports 50, 50 are provided in each side wall 52 of the reed cage 45.

Figure 3:
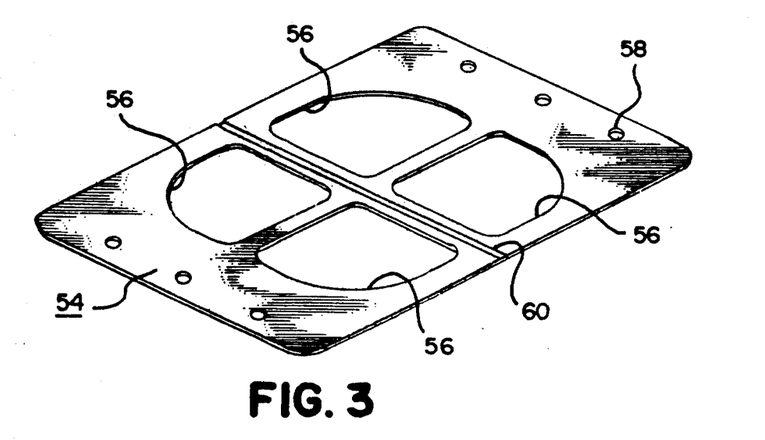
FIG. 3 is a three-quarter isometric view of an overlay plate for use with the embodiment of the present invention shown in FIG. 4.

Shown in FIG. 3 is an overlay plate 54 for use with this embodiment of the present invention. The overlay 54 has four overlay ports 56, 56, 56, 56 formed therein, each corresponding to one of the ports 50 in reed cage 45. Multiple openings 58, 58 are provided in the overlay 54 corresponding to each of the mounting holes 48 in the reed cage 45.

In the case of an overlay with a metal substrate, the overlay must be formed or bent to allow it to be positioned over the apex 36 of the reed cage 45. In the case of an overlay with an epoxy/fiber substrate, a groove 60 should be provided in the overlay 45 at the position where it must bend over the apex 36. The groove 60 should be formed in the fiber substrate and be of sufficient depth and width to permit the overlay to be easily hinged over the apex 36. As is explained below, the overlay may also be formed in two or more flat sections which terminate at, instead of bending over, the apex 36.

Figure 4:
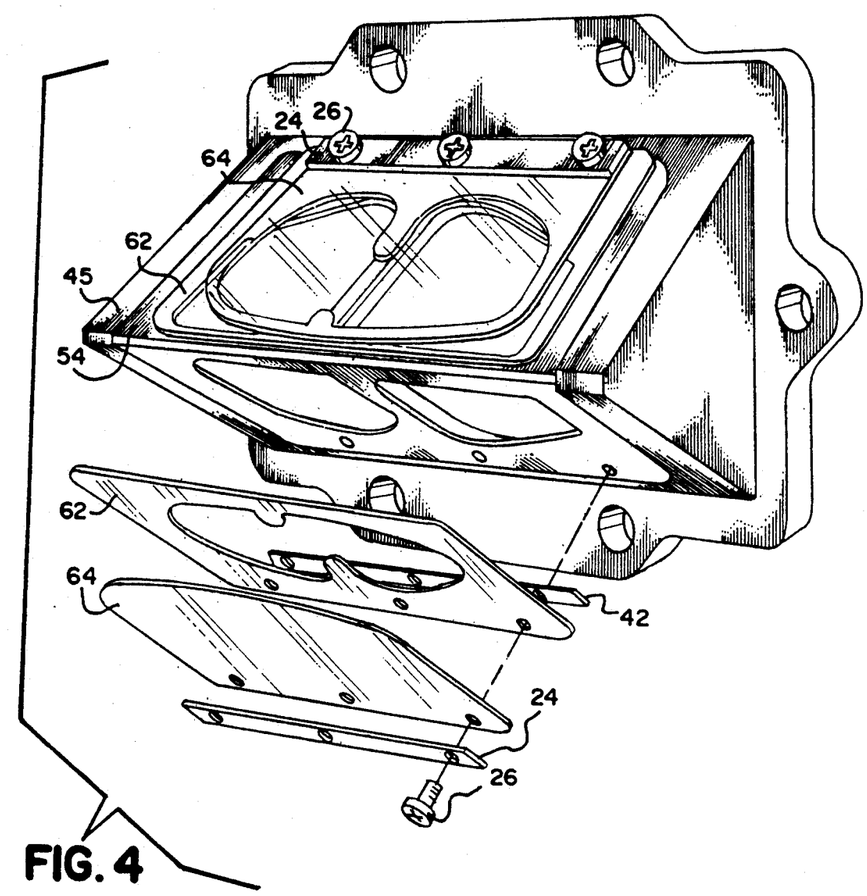
FIG. 4 is a three-quarter isometric view of another embodiment of a valve mechanism of the present invention, with the overlay and reed valves members shown in attached orientation on its top face, and the reed valve members and mounting hardware shown in exploded orientation from the bottom face.

The overlay 54 is shown in mounted position on reed cage 45 in FIG. 4. As can be seen, the overlay ports 56, 56 line up with the reed cage ports 50, 50 to provide unobstructed fluid flow through the reed mechanism when the reed members are in an open position. The use of openings 58 permit the overlay 54 to be attached to the reed cage 45 with the same base plate 24 and mounting bolts 26 used to mount reed valve members 62, 64. For improved performance and longer overlay life, the overlay 54 should also be glued into position on the cage 45.

A reinforcement plate 42 is oriented between the overlay 54 and primary reed valve member 62. This plate 42 is considered particularly advisable for use when the elastic overlay 54 extends below the level of the mounting holes 48. Without a solid, non-elastic substrate under the reed valve members 62, 64, the reed members tend to be distorted into a slightly raised position when the mounting hardware 24, 26 is tightened down upon the reed members. This distortion of the reed members places needless stress upon the base of the valve members and deforms the reed members away from the valve seats. In instances where the reed cage is designed to have the reed members mounted directly over the overlay 54, the use of some form of reinforcement plate 42, which provides a solid, non-yielding surface to which to mount the reed members and disperses the downward pressure from the mounting hardware 24, 26, greatly reduces premature reed member fatigue and assures a tight closing of the reed members.

Once installed on the reed cage, the overlay of the present invention provides a valve mechanism which functions in a manner indistinguishable from the finest rubber coated reed construction. Most importantly, the method of construction of the present invention provides a smooth and even valve seat without the need to perform tedious machining of the valve seat on the reed cage itself. When used with mechanical attachment means and/or removable adhesives, the present invention allows for the replacement of a worn valve seat (i.e. overlay) alone, instead of replacing an entire reed cage—as is the only practical approach with conventional rubber coated reed cages.

Figures 5, 10, 11:
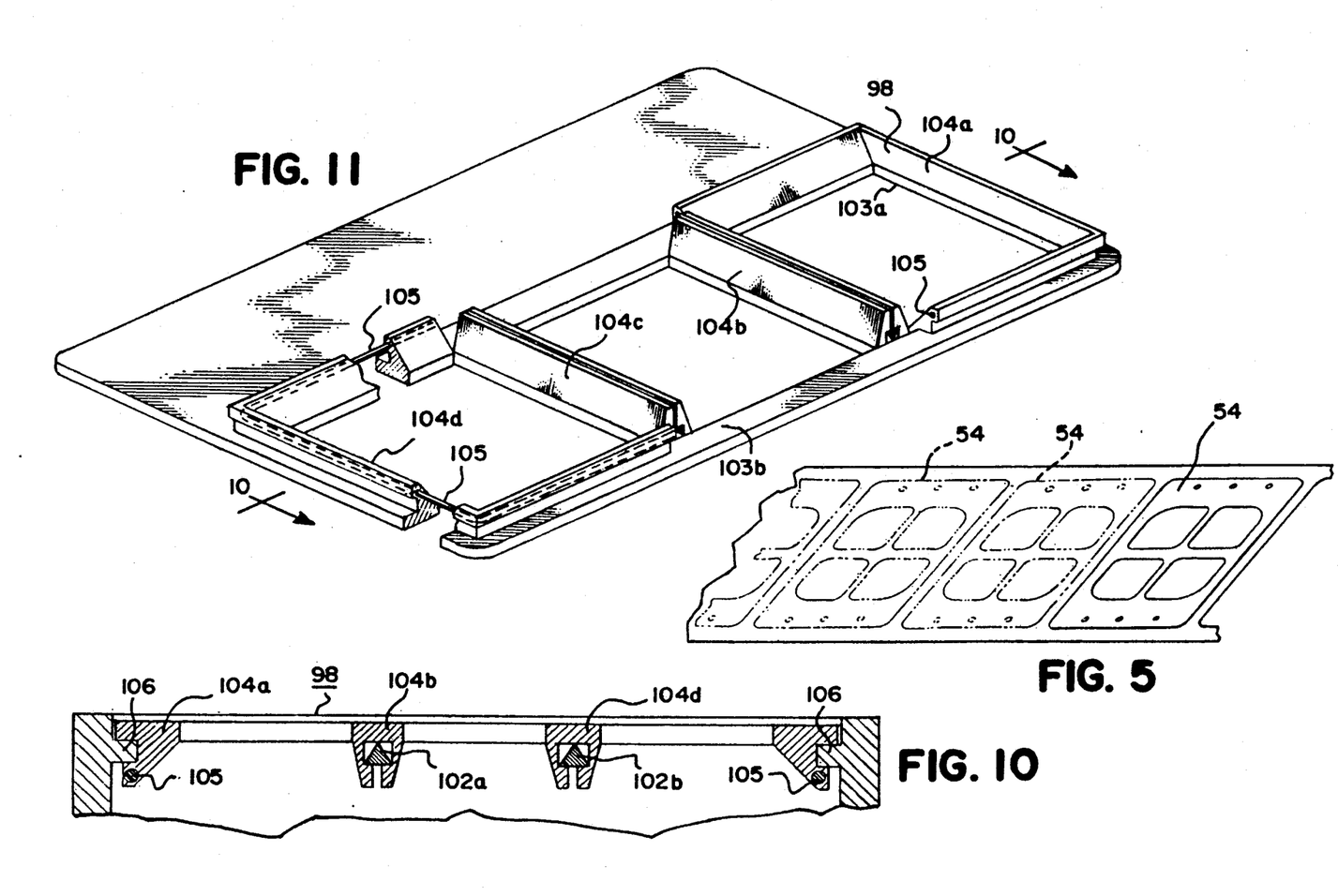
FIG. 5 is a three-quarter isometric view of a portion of a sheet of overlay plate material, including a stamped out overlay of the type employed in the embodiment of FIG. 4.
FIG. 10 is a cross-sectional view along line 10—10 of FIG. 9.
FIG. 11 is a three-quarter isometric view of the underside of the overlay employed in FIG. 9.

The ease of construction of the present invention is illustrated in part in FIG. 5. By providing an entire sheet 66 of resilient material coated substrate, numerous overlays 54 can be readily stamped or cut out in rapid succession. Since flat sheets of uniform rubber coated substrate is simply produced and is commercially available from a number of sources, the reed valve mechanism of the present invention may be produced at a mere fraction of the cost of conventional rubber coated reed cages. By way of example, where a conventional rubber coated reed cage can be produced at a cost of $3.00 per unit in high quantities, it is expected that the present invention can be constructed in quantity at a cost of less than $1.00 per unit.

Figures 6, 9, 12:
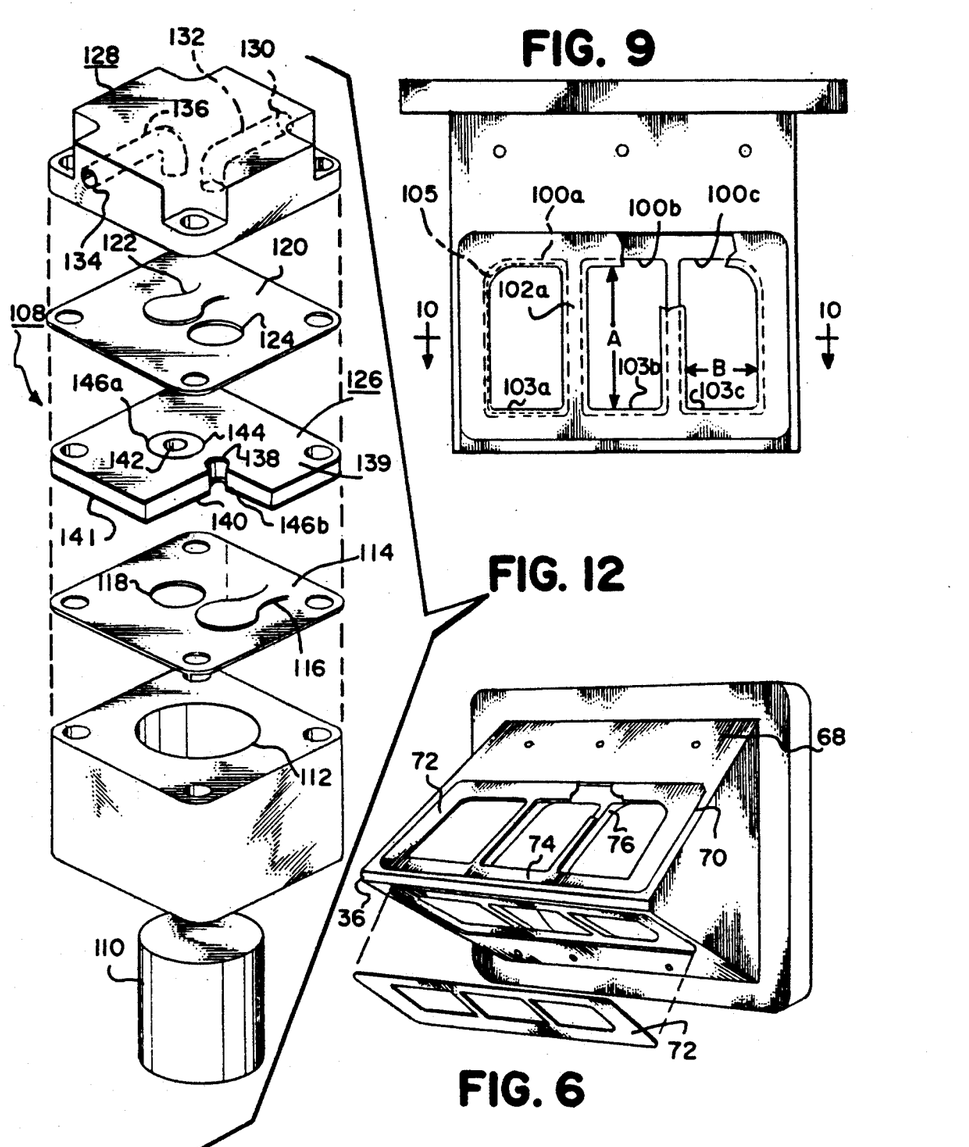
FIG. 6 is a three-quarter isometric view of a further embodiment of a reed cage and overlay plate for use with the present invention, with the overlay shown in attached orientation on the top face and in exploded orientation from the bottom face.
FIG. 9 is an elevational view of another embodiment of the present invention including an overlay plate with alternative means to mount it to the reed cage.
FIG. 12 is an exploded isometric view of another embodiment of the reed cage mechanism of the present invention shown in conjunction with component parts of an air compressor.

Shown in FIG. 6 is a reed cage 68 containing a recessed area 70 of the form and dimensions commonly employed today in rubber coated reed valves. As can be seen, an overlay 72 may be easily constructed to be attached directly with such a recessed area 70, with no further modification of the reed cage. In this instance the overlay 72 comprises a completely flat plate dimensioned to terminate just short of the apex 36 of the reed cage 68 on each side wall of the reed valve. Since no mechanical anchorage means is provided, these overlays 72 must be glued into position. It should be understood that, with appropriate additional recesses, a bent or hinged overlay, like the form shown in the embodiments of FIGS. 1 and 4, may be substituted for the flat overlay 72 employed in this embodiment.

To further limit premature wear, the distance between the apex 36 and the top 74 of each port 76 has been increased in this embodiment. Since the greatest wear on reed valve members occurs at their top end, it has been found that a longer and wider cushioned apex provides far greater reed valve member integrity and prolonged reed valve life.

As has been noted, the use of a reed cage with a recessed area surrounding each reed cage port is preferred in the present invention. By installing overlays in such recesses, it is assured that the reed valve members will close in a completely straight orientation and will seal evenly. This is viewed as being important in maximizing reed valve performance and life.

The recesses can be formed in the valve cage in any conventional manner. As has been explained, in preparation for rubber coating, recesses are formed in conventional reed valves by casting the reed valve and then machining the recess into each side wall. More recently, the reed valves have been casted to include such recesses. Either of these techniques is suitable for use with the present invention. Additionally, with advances in the heat resistance and durability of plastics technology, it is now practical to form reed cages from injected reinforced plastics—with the appropriate recesses molded into the final product.

Depending on application, the recesses may be formed in the manner shown in the present application, with one recessed area covering most of an entire side wall of a reed cage, or with recessed areas generally limited to the valve seat area surrounding each individual reed cage port.

Although not preferred, the present invention may also be implemented with no recesses or only partial recesses in the reed cage. This is an attractive option for modification of existing reed cages which have no or insufficient recesses to accommodate an overlay of the present invention, or for reconditioning conventional rubber coated reed cages which have undergone deterioration of the rubber coating. Although employing an overlay in these instances may present a somewhat uneven surface for the valve members to close upon, the improved cushioning effect should more than compensate for stresses caused by a slightly uneven valve seat.

Figure 7:
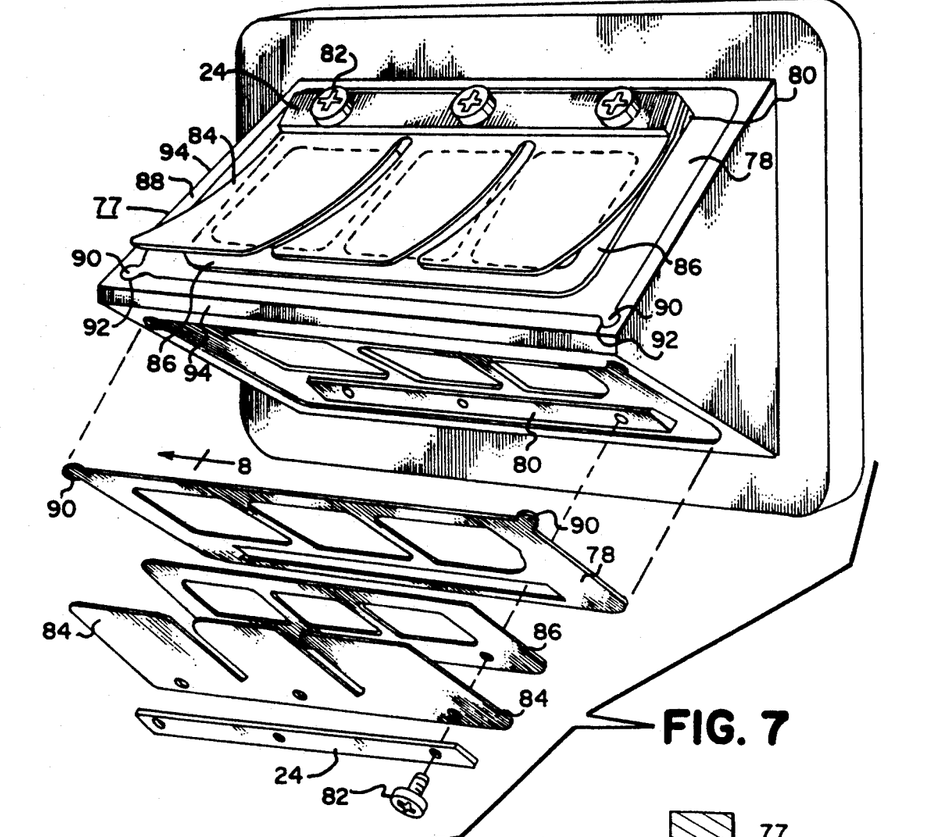
FIG. 7 is a three-quarter isometric view of another embodiment of the valve mechanism of the present invention, showing the reed cage, the overlay plate, and reed members attached on the top face and in exploded orientation from the bottom face.
Figure 8:
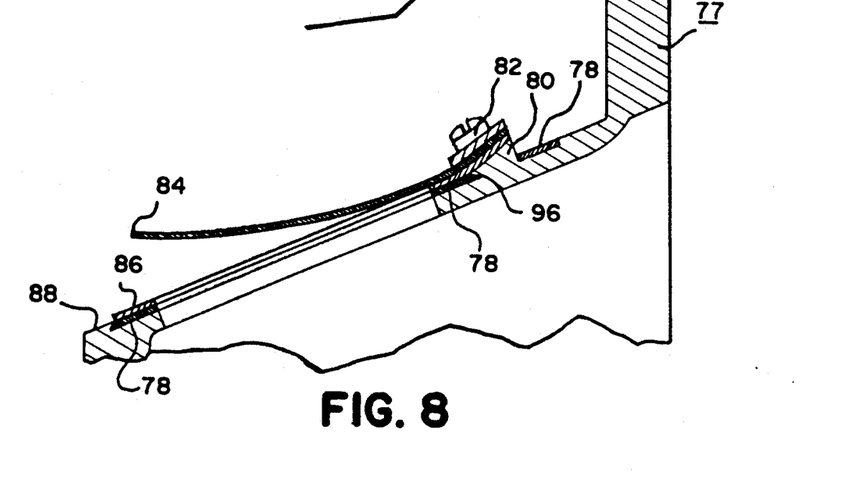
FIG. 8 is a cross-sectional view along line 8—8 of FIG. 7.

Shown in FIGS. 7 and 8 is another embodiment of a reed cage 77 an overlay 78 for use with the present invention. In this embodiment the overlay 78 surrounds an elevated land 80 to which reed valves 84, 86 are attached using bolts 82. The use of an elevated land 80 provides a number of distinct advantages over prior reed cage designs.

As is shown in FIG. 8, the elevated land 80 permits the reed valves to be mounted completely above face 88 of the reed cage 77, with the reed face 88 cushioned right up to the land 80. This limits the stress on the reed members 84, 86 by providing a completely flat surface for the reed valves to close against and assuring that the reed valves are oriented evenly along their entire lengths. Additionally, the extension of cushioning up to the base of the land 80 further limits the stresses caused by the closing of the reed valve members against the valve face 88.

Another improvement with an elevated land 80 is the ability to provide a more reliable biasing force to keep the valve members closed. Presently reed valve members are often curved or "cupped" to provide a downward bias and to assure a tight seal. Although this improves the seal, this distortion of the valve members tends to weaken the valve members and shorten their life. By providing a slope on the land 80 as is shown in FIG. 8, flat reed valve members 84, 86 may be automatically biased in a closed position to provide more positive closing and less stress upon the reed members. Furthermore, this biasing force also serves to help retain the overlay 78 in an attached position.

This embodiment highlights another major advantage of the present invention. In previous techniques for rubber coated reed cage construction, a flat outer face 88 on the reed cage 77 was desirable to provide ease in machining the rubber surface into a flat, finished surface. This may be one reason why it was never contemplated to provide an elevated or angled land area for attachment of the reed valves. Similarly, it was often not practical to attempt to rubber coat conventional reed cages down to the level of the reed valve mounting holes 48.

Alternative means to mount the overlay 78 are also shown in FIGS. 7 and 8. Similar to the interlocking attachment means illustrated in FIG. 1, projections 90, 90 are included on the overlay 78. In this embodiment, the projections 90, 90 interlock with complementary recessed extensions 92, 92 on the reed cage's apex end 94. Two other attachment means are shown in FIGS. 7 and 8 which work in concert with the projections 90 and recessed extensions 92.

First, the reed cage 77 is provided with a contoured recess 96 adapted to retain the overlay 78. As is shown in FIG. 8, by forming the recess 96 so that its sidewall is angled inward (or provided with a lip), and by forming the overlay 78 so that it is angled in the opposite direction (or is adapted to fit under a lip), the overlay 78 can be snapped securely into the reed cage 77. If the overlay 78 is formed from a material with sufficient resilience to bending forces, the overlay may be easily installed by bending it slightly, inserting it, and allowing it to spring back to a flat position installed in the recess 96.

Second, the installation of the overlay 78 around the elevated land 80 provides another form of anchorage. Cooperating with the opposite retention forces of the projections 90 and recessed extensions 92, the installation of the overlay around the elevated land 80 produces sufficient tension to retain the overlay 78 in position. As was noted above, it is preferred that an adhesive is applied in all these instances to assure that the overlay remains affixed to the cage.

Shown in FIGS. 9, 10, and 11 is a further embodiment of an overlay 98 and a reed cage 99 of the present invention. The reed cage 99 includes multiple ports 100a, 100b, 100c separated by dividers 102a, 102b. In this form, the overlay 98 includes multiple clips 104a, 104b, 104c, 104d affixed to the overlay and adapted to attach to the reed cage 99. The intermediate clips 100b and 100c surround the dividers and fasten into place around them. The end clips 104a and 104d are adapted to attach to a lip 106, 106 on the outer periphery of ports 100a and 100c.

The clips 104 may be constructed from any flexible material. Preferably the clips 104 are molded from a relatively stiff, resilient material, such as a fluoroelastomer (e.g. VITON ®), which has high chemical and temperature resistance. The clips may then be permanently attached to the overlay by any known means, such as through adhesives or by molding the clips directly into the overlay material.

The use of clips allows the overlay 98 to be installed extremely easily by simply pressing it into place onto a reed cage 99. Depending on the application, the clips may be provided in a variety of locations surrounding the periphery of any of the ports. As should be evident, the clip mounting method may be easily combined with one or more of the methods already discussed for improved valve operation and/or even more secure mounting.

The present invention may be used to produce cushioned valve seats for a wide variety of applications for which the expense of a conventional cushioned valve seat simply cannot be justified. One such area is for producing a valve seat for compressors and similar devices. Although reed valve failure is a distinct problem in these applications, presently manufacturers have looked to coated reed valves and other far more inexpensive methods of extending reed valve life rather than saddle consumers with the expense of a coated reed cage.

Shown in FIG. 12 are component parts of a typical compressor 108. The compressor 108 comprises a piston 110 connected to a motor (not shown), a cylinder 112 in which the piston 110 reciprocates, a first reed valve plate 114 having a reed valve member 116 and an opening 118 therein, a second reed valve plate 120 having a reed valve member 122 and an opening 124 therein, a reed cage 126 to which the first and second reed valve plate are attached, and a head unit 128. In the head unit 128 is an inlet opening 130 connected to an intake passage 132, and an outlet opening 134 connected to an outlet passage 136. Within the reed cage 126 is an intake port 138 and intake valve seat 140 on a bottom side wall 141, and an outlet port 142 and an outlet valve seat 144 on a top side wall 139.

As is known, in operation the piston 110 descends and pulls fluid in the intake opening 130, through intake passage 132, through opening 124 and intake port 138, past reed valve member 116, and into cylinder 112. No flow is drawn through the outlet passage 136 because the outlet port 142 is blocked by reed valve member 122. On the pressure stroke of the piston 110, the intake port is block by reed valve member 116, and fluid is forced through opening 118, outlet port 142, reed valve member 122, outlet passage 136, and outlet opening 134.

In a conventional compressor with un-cushioned valve seats, the rapid cycling of the compressor causes the reed valve members 116, 122 to undergo considerable stress. This is avoided in the present invention by providing a cushioned overlay 146a, 146b of the present invention on each of the valve seats 140, 144 on each side wall of the reed cage 126. The overlay 146 may take any form from a washer-shaped unit glued in place, as is shown in FIG. 12, to a reed cage with its entire surface provided with a resilient layer of material.

As was true with the embodiments discussed above, the preferred overlay 146 comprises a solid substrate of metal, fiber, or similar material, coated with a layer of impact absorbing resilient material, such as an elastomer. To keep costs to a minimum, it may be desirable to provide some form of locking arrangement to make valve cage 126 assembly as straightforward as possible. Other possible applications for a reed cage of the present invention may include the use of rubber coated overlays on "reed cages" where the means to anchor the reed valves are bolted directly to an engine's manifold. In embodiments of this type, where multiple reed valves are often "stacked" in series, the present invention may provide substantial cost savings.

Figure 13:
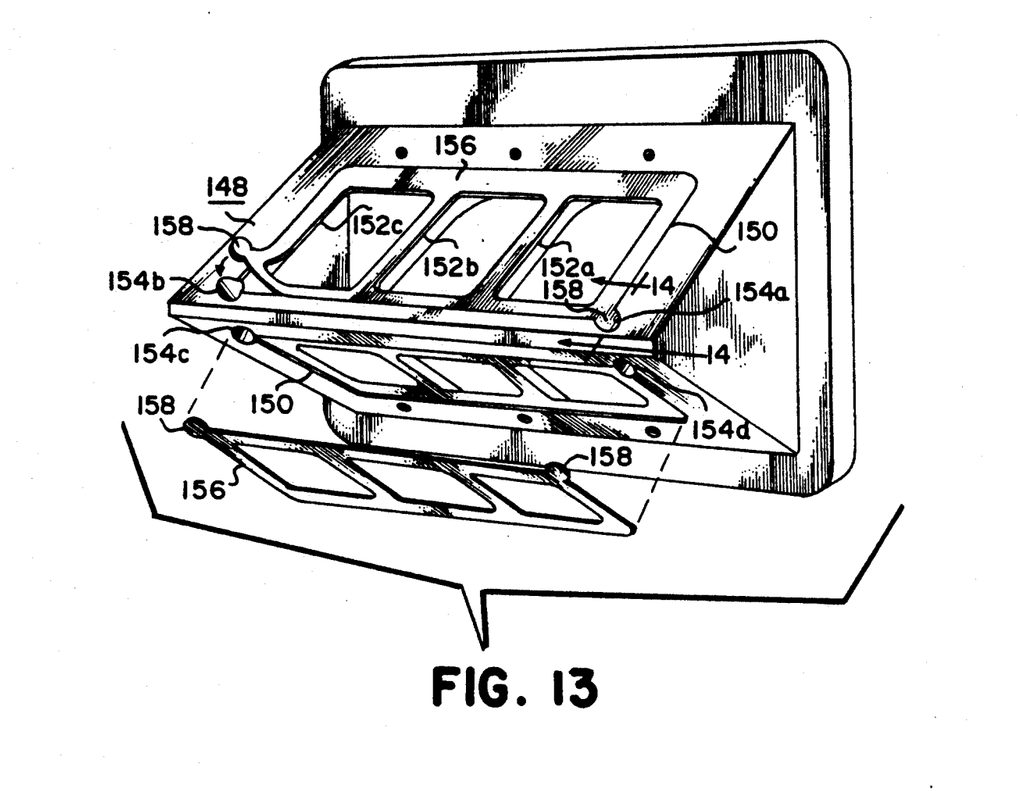
FIG. 13 is a three-quarter perspective view of another reed valve cage for use with the present invention, showing modified concave recessed extensions and the overlay partially pulled away from the reed cage on one side wall to show detail and completely exploded from the opposite side wall.
Figure 14:
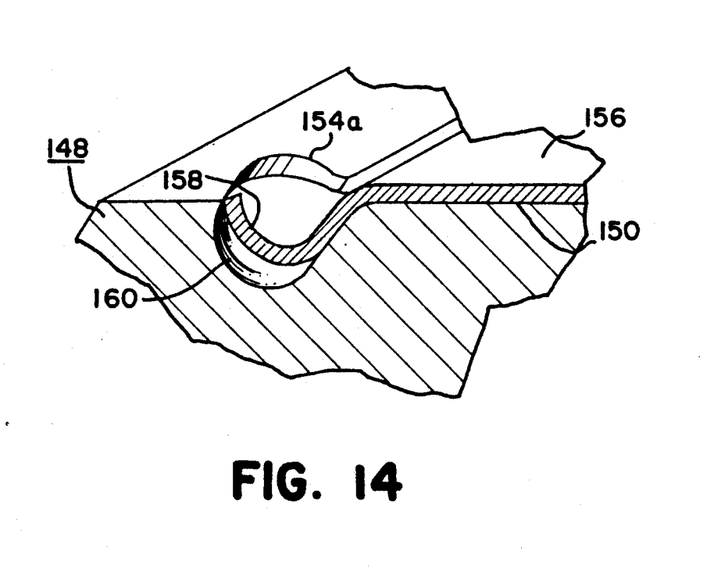
FIG. 14 is a sectional view along line 14—14 of FIG. 13, showing an overlay a projection inserted into the concave extension.

Another improvement in the locking means of the present invention is shown in FIG. 13 and 14. Shown in FIG. 13 is a reed cage 148, including a recessed area 150 surrounding each port 152a, 152b, 152c. Similar to the one of the mounting means shown in the embodiments of FIGS. 7 and 8, this embodiment includes recessed extensions 154a, 154b, 154c, 154d. An overlay 156 is provided which fits within the recessed area 150 and includes projections 158 corresponding to each of the recessed extensions 154.

As may be better seen in FIG. 14, in this embodiment, the recessed extensions 154 are hollowed to form a concave cavity 160 below the level of the remainder of the recessed area 150. In order to provide very rapid mounting of the overlay 156, in this embodiment each projection 158 may be pressed into the cavity 160 to help hold the overlay 156 in place. By forming the overlay 156 out of a somewhat malleable substrate material, such as certain metals or plastics, the projections 158 can be distorted into a "locked" position within the cavity 160 which helps retain the overlay 156 in place. A ridge, groove, or similar modification may be made in the recessed extension 154 to assist in holding the projection 158 in place.

Figure 15:
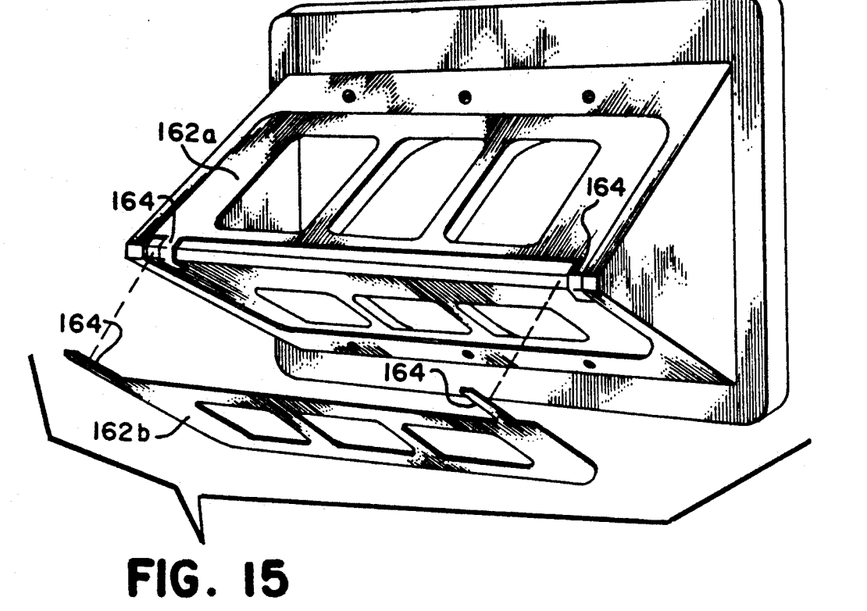
FIG. 15 is a three-quarter perspective view of a V-shaped reed cage for use with the present invention, showing another means for securing the overlay to the reed cage attached on one side wall and exploded from the opposite side wall.

Yet another variation in mounting means is shown in FIG. 15. In this embodiment, each of the overlays 162a, 162b includes moldable fingers 164. Each of the fingers 164 is adapted to be bent over the reed cage's apex 166 to help clamp the overlay in position. Again, this mounting means permits very rapid attachment of the overlay with minimal effort and equipment. Ideally this embodiment is best employed with other mounting means, such as the form shown at the base of this overlay, and/or with adhesive to help retain the fingers and overlay in position once attached.

Figure 16:
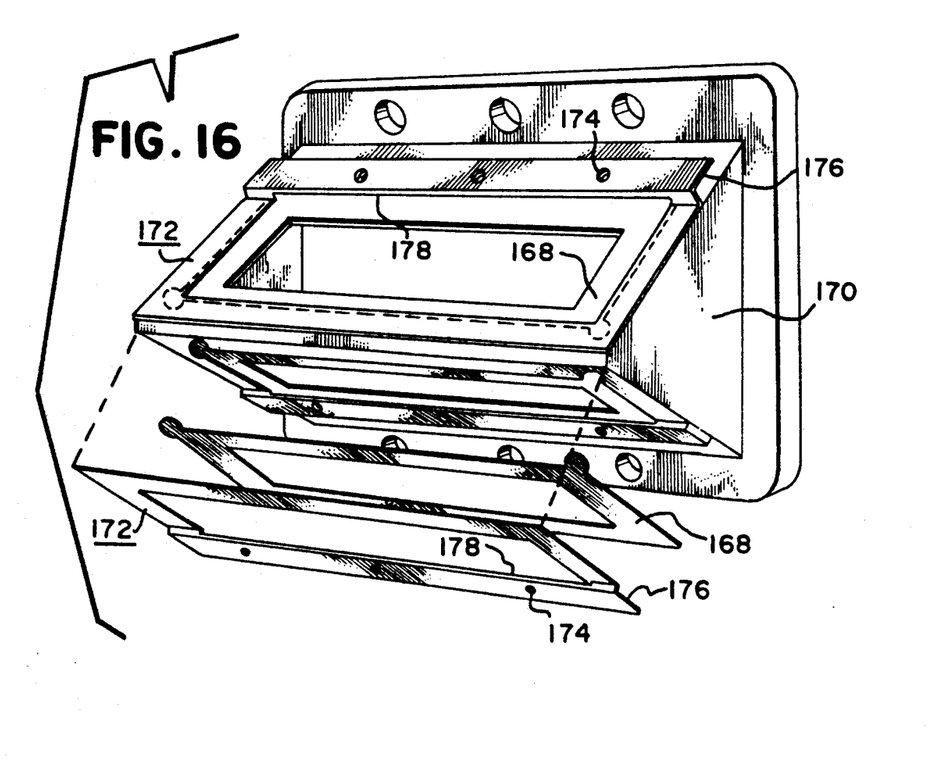
FIG. 16 is a three-quarter perspective view of a reed cage and overlay of the present invention and including a frame to help secure the overlay in position, with the frame and overlay shown attached on one side wall and exploded from the opposite side wall.

FIG. 16 shows another improved method of mounting an overlay 168 to a reed cage 170. In this embodiment a frame 172 is used to mount in part over the periphery of overlay 168 and help retain it in position. Once the overlay 168 is aligned on the reed cage 170, the frame 172 is then positioned over the overlay and connected to the reed cage 170.

The frame 172 may be easily attached using any convenient method. In the illustrated form, mounting holes 174 are included in the frame to allow attachment with the same hardware used to mount the reed valves. The frame 172 may be fashioned essentially flat to be used in place of a base plate to hold the reed valve members in place, or, as is shown, with a raised section 176 which may be situated over the base plate. In either instance, reed stops (not shown) may be included on the frame to restrict the degree of bend of the reed members. With a raised section 176 embodiment, a slot 178 should be included to permit the free movement of the reed valves.

Although this mounting method requires additional hardware, it assures a tight and uniform attachment of the overlay to the reed cage. From the above description, it should be apparent that this mounting method may be employed alone or in conjunction with one or more of the other described mounting methods or other methods which may be developed.

As should be evident, the present invention may be quite useful in virtually any application where reed valve-type valve mechanisms are employed. In light of such varied applications, the use of the term "reed cage" in the present application is intended to include any device or mechanism used to anchor a reed valve-type member, whether the side wall is mounted parallel with, perpendicular to, or at an angle to the flow of fluid through the reed mechanism.

With respect to internal combustion engines, it should be understood that the present invention may be used with all forms of reed valves, including single and multiple stage reed valves, to control fluid intake of air or air and fuel in all forms of internal combustion engines, whether carbureted or fuel injected. Additionally, the present invention may be used with equal success in both two-stroke cycle and four-stroke cycle engines. Accordingly, the use of the terms "fluid intake" and "fluid flow" are intended to be broadly construed to include air or air/fuel intake and fluid transfer to a combustion chamber in a crankcase compression engine, as well as all forms of fluid transfer in compressors and similar devices.

Although particular embodiments of the present invention are disclosed herein, it is not intended to limit the invention to such a disclosure and changes and modifications may be incorporated and embodied within the scope of the following claims.

What is claimed is:

1. A reed valve mechanism positioned in a fluid passage for use to control fluid flow through the fluid passage, which mechanism comprises:
   a reed cage having at least one side wall and at least one port in the side wall to allow passage of fluid through the reed valve mechanism;
   a reed valve member attached to the reed cage to control the flow of fluid through the port by alternating between open and closed positions;
   a recessed area on the side wall surrounding the port;
   an overlay adapted to mount within the recessed area on the side wall to provide a cushioned surface for the reed valve to contact in a closed position;
   wherein the overlay is a separate plate attached to the reed cage, and comprises a substrate and a resilient coating affixed to the substrate.

2. The reed valve mechanism of claim 1 wherein the substrate comprises a fiber composite.

3. The reed valve mechanism of claim 1 wherein
   the reed cage includes a base plate which assists in retaining the reed valves to the reed cage;
   the recessed area in the side wall extends below the base plate;
   the overlay is adapted to seat within the recessed area on the side wall extending below the base plate; and
   the overlay is attached to the reed cage at least in part beneath the base plate.

4. The reed valve mechanism of claim 3 wherein the overlay and the recessed area on the side wall include complementary interlocking means to assist in attaching the overlay to the reed cage.

5. The reed valve mechanism of claim 3 wherein the overlay is also attached to the reed cage by an adhesive.

6. The reed valve mechanism of claim 1 wherein the overlay is attached to the reed valve cage by an adhesive.

7. The reed valve mechanism of claim 1 wherein the overlay includes a port formed therein corresponding to each port in the reed cage so as to surround each port in the reed cage completely when the overlay is attached to the reed cage.

8. The reed valve mechanism of claim 7 wherein the overlay is attached to the reed cage by application of an adhesive around the periphery of each port.

9. The reed valve mechanism of claim 1 wherein
   the mechanism comprises a V-shaped reed cage with its apex presented downstream of the direction of fluid flow through the passage, and the reed cage includes converging side walls meeting at the apex and at least one port in each of the side walls;
   the overlay comprises a V-shaped unit corresponding to the shape of the reed cage, having ports formed therein, each port in the overlay corresponding with each of the ports in the reed cage; and
   wherein the reed cage is recessed in an area surrounding each of the ports and extending over the apex of the cage, the overlay being adapted to seat within the recessed area.

10. The reed valve mechanism of claim 9 wherein
    the reed cage includes a base plate on each side wall which assists in retaining the reed valves to the reed cage;
    the recessed area in each side wall extends below each base plate;
    the overlay is adapted to seat within the recessed area on each side wall extending below each base plate; and
    the overlay is attached to the reed cage at least in part beneath each base plate.

11. The reed valve mechanism of claim 10 wherein the overlay and the recessed area on the side wall include complementary interlocking means to assist in attaching the overlay to the reed cage.

12. The reed valve mechanism of claim 10 wherein the overlay is attached to the reed cage with an adhesive.

13. The reed valve mechanism of claim 9 wherein the substrate comprises a fiber composite.

14. The reed valve mechanism of claim 13 wherein the resilient material is selected from the group consisting of buna-N rubber, urethane rubber, silicone rubber, neoprene rubber, and fluoroelastomers.

15. The reed valve mechanism of claim 1 wherein the overlay and the recessed area on the side wall include complementary interlocking means to assist in attaching the overlay to the reed cage.

16. The reed valve mechanism of claim 1 wherein the reed valve member mounts to a non-yielding surface on the side wall of the reed cage.

17. The reed valve mechanism of claim 16 wherein the non-yielding surface comprises a reinforcement plate mounted over the overlay.

18. The reed valve mechanism of claim 1 wherein the reed valve member mounts to an elevated land on the side wall of the reed cage.

19. A method of construction of a reed valve mechanism to control fluid flow through a fluid passage, the reed valve mechanism including a reed cage, at least one side wall on the reed cage, at least one reed cage port in the side wall, and a reed valve member attaching to the reed cage to cover the reed cage port, the reed valve member oscillating between open and closed positions to control the flow of fluid through the reed cage port, which method comprises:
   forming multiple overlays from a sheet of substrate to which a resilient coating is affixed, each overlay adapted to be attached to a reed cage to provide a cushioned seat surrounding each reed cage port and supporting the reed valve when it is in a closed position;
   providing an overlay port in each of overlays corresponding to each reed cage port; and
   employing mechanical mounting means to attach each overlay to the reed cage to provide for fluid flow through the overlay port and the reed cage port when the reed valve is in an open position.

20. The method of construction of claim 19 wherein the multiple overlays are formed by stamping them out of the sheet.

21. The method of construction of claim 19 wherein the reed cage is caused to be recessed in an area surrounding each of the reed cage ports, the overlay being adapted to seat within the recessed area.

22. The method of construction of claim 21 wherein the reed cage is recessed by machining the area surrounding each reed cage port.

23. The method of construction of claim 21 wherein the reed cage is recessed by casting the reed cage to include such recess.

24. The method of construction of claim 21 wherein the mechanical mounting means includes a base plate on each side wall which assists in retaining the reed valves to the reed cage;
   the recessed area in the reed cage extends below each base plate;
   the overlay is adapted to seat within the recessed area extending below each base plate; and
   the overlay is attached to the reed cage at least in part beneath each base plate.

25. The method of construction of claim 19 wherein the mechanical mounting means includes complementary interlocking means to assist in attaching the overlay to the reed cage.

26. The method of construction of claim 25 wherein an adhesive is employed to attach the overlay to the reed cage.

27. The method of construction of claim 19 wherein an adhesive is employed to attach the overlay to the reed cage.

28. The method of construction of claim 19 wherein the reed valve member mounts to an elevated land on the side wall of the reed cage.

29. A reed valve mechanism positioned in a fluid passage for use to control fluid flow through the fluid passage, which mechanism comprises:
   a reed cage having at least one side wall and at least one port in the side wall to allow passage of fluid through the reed valve mechanism;
   a reed valve member attached to the reed cage to control the flow of fluid through the port by alternating between open and closed positions;
   an overlay adapted to cover the side wall of the reed cage to provide a cushioned surface for the reed valve to contact in a closed position, the overlay comprising a separate plate which is attached to the reed cage;
   the mechanism comprises a V-shaped reed cage with its apex presented downstream of the direction of fluid flow through the passage, and the reed cage includes converging side walls meeting at the apex and at least one port in each of the side walls;
   the side wall of the reed cage is recessed in an area surrounding each port, the recess extending over the apex of the reed cage; and
   the overlay comprises a V-shaped unit corresponding to the shape of the reed cage, having ports formed therein, each port in the overlay corresponding with each of the ports in the reed cage, the V-shaped unit being adapted to seat within the recessed area.

30. The reed valve mechanism of claim 29 wherein the reed cage includes a base plate on each side wall which assists in retaining the reed valves to the reed cage;
   the recessed area in each side wall extends below each base plate;
   the overlay is adapted to seat within the recessed area on each side wall extending below each base plate; and
   the overlay is attached to the reed cage at least in part beneath each base plate.

31. The reed valve mechanism of claim 30 wherein the overlay and the recessed area on the side wall include complementary interlocking means to assist in attaching the overlay to the reed cage.

32. The reed valve mechanism of claim 29 wherein the overlay plate comprises a substrate and a resilient coating affixed to the substrate.

33. The reed valve mechanism of claim 29 wherein a frame is provided which mounts over the overlay and assists in retaining the overlay in position.

34. The reed valve mechanism of claim 29 wherein the overlay and the recessed area on the side wall include complementary interlocking means to assist in attaching the overlay to the reed cage.

35. The reed valve mechanism of claim 29 wherein the reed valve member mounts to a non-yielding surface on the side wall of the reed cage.

36. The reed valve mechanism of claim 35 wherein the non-yielding surface comprises a reinforcement plate mounted over the overlay.

* * * * *